United States Patent [19]

Horton

[11] Patent Number: 4,804,695

[45] Date of Patent: Feb. 14, 1989

[54] METHOD AND COMPOSITION FOR PRODUCING AND INSTALLING CELLULOSIC INSTALLATION

[75] Inventor: Paul H. Horton, Hollis, Okla.

[73] Assignee: Western Fibers, Inc., Hollis, Okla.

[21] Appl. No.: 92,631

[22] Filed: Sep. 3, 1987

[51] Int. Cl.$^4$ .................................................. C08L 1/08
[52] U.S. Cl. .......................................... 524/27; 52/404; 106/168; 106/203; 252/62; 524/31; 524/32; 536/56; 536/57
[58] Field of Search ............................. 524/27, 31, 32; 106/168, 203; 52/404; 252/62; 536/56, 57

[56] References Cited

U.S. PATENT DOCUMENTS 4,040,856  8/1977  Litzingst ............................ 106/203
4,468,336  8/1984  Smith ................................. 106/168

OTHER PUBLICATIONS

Apr. 1986 Material Safety Data Sheet for Wex ™, Conklin Co., Inc.
Instruction Sheet for Wex ™, 1984, Conklin Co., Inc.
8-21-85 Material Safety Data Sheet, Robond ™ L-12 Emulsion, Rohm and Haas Co.
1985 Technical Notes brochure on Robond ™, Rohm and Haas Company.
1980 brochure on Rhoplex ® N-1612, Rohm and Haas Company.
*Surfactants and Interfacial Phenomena*, M. J. Rosen, 1978, J. Wiley & Sons, Inc., p. 18.

*Primary Examiner*—Maurice J. Welsh
*Attorney, Agent, or Firm*—Dunlap, Codding & Peterson

[57] ABSTRACT

Methods for producing spray cellulosic insulation and for wet spray open cavity installation of such material. Processed cellulosic fibers are moistened with an expansion agent, preferably comprising water with a wetting agent mixed therein. For installation, a composition preferably comprising an adhesive and a wetting agent in water is used to moisten the material as it is blown into place.

41 Claims, No Drawings

METHOD AND COMPOSITION FOR PRODUCING AND INSTALLING CELLULOSIC INSTALLATION

FIELD OF THE INVENTION

The present invention relates generally to thermal insulation, and in particular to wet spray cellulosic fiber insulation for open cavity installation.

SUMMARY OF THE INVENTION

The present invention comprises a method for producing cellulosic insulation material. Processed cellulosic fibers are moistened with an expansion agent whereby the fibers become at least partially expanded. The expansion agent preferably comprises water having a wetting agent mixed therein. A method for installing spray cellulosic insulation material also is provided. While the material is blown into place, the material is moistened with a composition capable of rendering the blown material sufficiently adhesive. The composition preferably comprises a wetting agent and an adhesive mixed in water. The present invention further comprises cellulosic insulation material produced or installed by these methods and the composition used during installation. Still further, the invention comprises cellulosic insulation material for spray installation which material is characterized by being impregnated with an expansion agent.

DETAILED DESCRIPTION OF THE PREFERRED EMBODIMENTS

With the continuing increase in energy costs, the need for low cost, high performance thermal insulation continues to grow. The present invention reduces the cost of producing and installing cellulosic insulation. Yet, insulation produced and installed according to these methods meets all performance requirements relating to non-corrosiveness, flammability and thermal resistance.

The present invention is directed primarily to insulation material composed of loose cellulosic fibers and which is installed by the wet spray technique. More particularly, the present invention is directed to insulation material which is used to fill cavities inside walls, usually the spaces between studs. In so-called "open cavity" installation to which the present invention relates, the loose material is blown into each stud space (or cavity) from bottom to top before the wall is covered.

PRODUCTION OF INSULATION MATERIAL

In accordance with the method of the present invention, suitable starting material first is selected. The preferred starting material comprises recycled paper products, and these materials can be obtained at commercial recycling plants.

The starting material is selected to produce the desired consistency and color in the end product. As regards color, blank newsprint imparts a light grey color, craft paper a tan color, and newsprint a dark gray color. The consistency or body of the end product is partly a function of the length of the cellulose fibers of the starting materials, and paper products should be selected accordingly. For example, the coarser products, such as cardboard and craft paper have longer fibers, while newspaper comprises shorter fibers.

A preferable combination of recycled paper products comprises about 30% each of blank newspaper and craft paper and about 40% cardboard. Material produced from this combination provides an end product with an appealing tan color, and the mixture of short and longer fibers gives good body and resiliency to the material.

Once the starting material has been selected, it next preferably is processed, usually by grinding, to the desired consistency. For this purpose, commercially available paper mills are suitable.

In most instances, a hammer mill first is employed to break the crude paper products into chunks for further grinding. Then, a finer grind may be achieved using a paddle mill. The consistency is determined by the screen size of each mill. A preferred consistency for practice of the present invention is produced by using a 1 to 1½ inch screen size in the hammer mill and an 11/32 inch screen size in the paddle mill.

Most cellulosic insulation material is chemically treated to render the material flame resistant, vermin resistant and non-corrosive in accordance with federal standards. A preferred chemical for this purpose is crude boric acid, usually in powdered or granular form, and typically comprises about 58% boric acid to about 65% boric acid. Preferred brands include Boron-10 TM marketed by Notox Products Inc., (Phoenix, Ariz.) and L-100 TM powder marketed by Insul-Chem Co. (Lehi, Utah). Boric acid is added in an amount sufficient to produce material having at least the minimum required performance characteristics.

It will be understood that the end product of the method of this invention should be sampled and tested regularly to ensure that satisfactory flame resistance is being achieved, that is, that sufficient chemical is being added. Suitable methods for gauging flammability include the so-called "torch test", the basket test, the Monsanto (two foot) flame tunnel test and the Veriflux 100 test.

Preferably, the boric acid is combined with the cellulosic material after it has been at least partially processed. Most preferably, it is mixed with the material immediately prior to grinding the fibers in the paddle mill. To facilitate impregnation of the chemical, it may be ground to a powder of 200 mesh or finer.

After the processed fibers have been chemically treated, the fibers next are moistened with an expansion agent whereby the fibers become at least partially expanded. The expansion agent is a substance, usually in a liquid form, which is capable of penetrating cellulosic fibers and causing the fibers to at least partially re-expand from the collapsed form of the fibers in most paper products. Preferably, the expansion agent will comprise a substance which will remain impregnated in the fibers for a time after the liquid component has evaporated, for a purpose to be explained more fully below. A preferred expansion agent is water having a wetting agent mixed therein.

When the expansion agent is a mixture of water and a wetting agent, the preferred wetting agent is nonionic of a type which will remain within the fibers after the water has evaporated. More preferably, the wetting agent comprises an alcohol, such as a polyoxyethylenated straight-chain alcohol (linear alcohol ethoxylate). Suitable wetting agents are commercially available, and a particularly preferred wetting agent is Wex TM. This product comprises about 22%–23% by weight linear alcohol ethoxylate, about 7%–10% by weight propylene glycol, about 2.7% by weight dimethylpolysiloxane and about 68.3% by weight water. A mixture comprising 1 pint of Wax ™ per 100 gallons of water has a surface tension of about 25.4 dynes per centimeter, as compared to water alone which has a surface tension of 72 dynes per centimeter. This product is marketed by the Conklin Company, Inc., 551 Valley Park Drive, Shokopee, Minn. 55379.

Preferably, the mixture is substantially dilute, and comprises less than about 2.0% by weight wetting agent. More preferably, it comprises less than 1.0% by weight wetting agent, and most preferably, less than about 0.1%. Where Wex ™ is used, it is preferred to use about 1 pint of Wex ™ per 50 gallons of water to produce a mixture comprising about 0.6% by weight Wex ™.

It will be understood that generally the more expansion agent applied to the fibers, the better the expansion achieved. However, saturation to puddling should be avoided as this may cause some recollapse of the fibers. Moreover, several factors limit the amount of liquid which can be added feasibly. For example, sacking machines, the machines used to package the processed material, typically will not properly handle very moist material, although this varies to some extent among machines. Further, the fibers should be substantially dry for installation as most blowing machines are not adapted to apply wet material. Thus, for example, if during processing the fibers are heavily wetted with water, mechanical drying is required, and this is detrimental to the fibers as well as expensive.

By means of the present invention, good expasion is achieved with a relatively small amount of moisture, and as used herein, the term "moisten" means to render the fibers only slightly wet or damp. Thus, in the preferred production method, the expansion agent is applied to the processed cellulosic fibers in an amount sufficient to render the fibers only slightly damp to the touch. While the required amount of moisture will vary depending on ambient humidity and the amount of natural moisture already present in the fibers, the amount of moisture needed typically ranges from about 1% to about 10%, and most typically from about 3% to about 5% of the dry weight of the fibers.

To promote even application of the wetting agent mixture to the fibers, it is preferred to apply the expansion agent as a spray over the fibers while they are tumbling. For this purpose, a ribbon flight blender with entry spray attachment, which is a commercially available machine, is particularly suitable.

Even better expansion effects are produced when the expansion agent is heated, and a preferred temperature is 180° F. To this end, a commercial hot water heater is conveniently employed. Where a hot water heater is being used to heat the mixture, it may be easily connected in-line between the spray attachment on the blender and the receptacle containing the expansion agent mixture.

As the processed fibers leave the blender, they will be warm, about 150° F., and slightly damp to the touch. They may be sacked immediately in perforated, non-absorbant (plastic) bags. At this point the sacked material preferably is allowed to set for about 24 hours to allow the temperature of the material to return to normal and much of the moisture to evaporate. Where the preferred water-wetting agent mixture is used as the expansion agent, the fibers in the final product will be substantially dry and impregnated with wetting agent. After a sufficient setting period, the material is ready for use.

Installation of Insulation Material

In accordance with the method of the present invention, cellulosic insulation material is installed by the wet spray technique into a cavity. First, insulation material is selected, and for purposes of this method, the preferred material is cellulosic insulation impregnated with an expansion agent, such as a wetting agent, and preferably produced as described above.

The material may be installed using machines which are commercially available and designed for wet spray installation of cellulosic fiber insulation. A typical assembly comprises a blowing machine equipped with a wet spray apparatus connected to the end of the hose.

Preferably, the machine used will be designed or adapted to maintain a constant flow of material in small particle sizes and non-agglomerated form. The preferred machine will have adequate agitation to achieve the conditioning of the material that is desired. Both forced air and negative air systems are acceptable. The machine also should have material gates and variable air control to maintain the desired consistency. It will be appreciated that throughout the installation procedure, the density, the texture and the consistency of the blown material should be monitored regularly and the equipment adjusted as necessary.

The spray apparatus on most blowing machines has 6 to 8 nozzles for dispensing the fluid. However, as will be explained in more detail below, the installation method of the present invention requires the use of substantially less water per unit of insulation material. Accordingly, it may be desirable to reduce the number of nozzles. Most preferably about 2 nozzles with tip sizes ranging from 4001 to 4002 will be employed.

Using the selected installation equipment, the cellulosic insulation material is installed in the cavity to be filled. As the material is blown into place, the material is moistened with a composition capable of rendering the blown material sufficiently adhesive to remain in the blown position until the cavity is enclosed or covered. "Moisten" as used herein means to render the material only slightly wet or damp.

"Adhesive" when used to describe the consistency of the installed or blown material refers to the ability of the material to remain in the blown position. The adhesiveness of the blown material is a function of both physical and chemical phenomena. In part, the adhesiveness of the blown material is a result of the intertwining fibers of varying lengths and this is enhanced when the intertwined fibers are further expanded during installation. Moistening of these fibers with water, especially in the presence of a wetting agent as provided in this invention, results in some stickiness between the fibers. Even better adhesiveness is achieved when a chemical adhesive, such as an acrylic adhesive, is added to the wet spray composition, although the use of such a binding agent is not essential.

The composition used as the wet spray of this method preferably comprises an expansion agent, usually in liquid form, which is capable of penetrating and at least slightly expanding the fibers. The preferred composition comprises water having a wetting agent mixed therein.

Preferably, the wetting agent is nonionic, more preferably is an alcohol and most preferably is a straight-chain alcohol, such as a polyoxyethylenated straight-chain alcohol. A particularly preferred wetting agent is Wex TM, previously described. When the insulation material being installed is impregnated with a wetting agent, such as material produced in accordance with the above described method, it will be preferred that the same wetting agent be used as the expansion agent in the installation composition.

The expansion agent, such as the wetting agent, is mixed in the liquid, usually water, in relative amounts to produce a composition which will render the insulation material sufficiently moist and adhesive for open cavity application, yet dry enough that the density of the installed material can be controlled. In most instances, it will be preferred that the wetting agent be substantially diluted. A preferred concentration of wetting agent is less than about 2.0%, more preferably less than 1.0% and most preferably less than about 0.1% by weight. For example, where Wax TM is used, the preferred concentration is produced by mixing 1 pint of Wex TM in 50 gallons of water to produce a mixture comprising about 0.6% by weight Wex TM.

The composition also preferably comprises an adhesive. Preferably, the adhesive comprises a water dispersible polymer which may be synthetic or naturally occurring. More preferably, the adhesive comprises an acrylic polymer emulsion. A particularly preferred adhesive is Robond TM L-12 Emulsion, marketed by Rohm and Haas Company, Independence Mall West, Philadelphia, Pa. 19105. Robond TM L-12 Emulsion is an aqueous acrylic emulsion which comprises 45% by weight acrylic polymer, 0.1 (max.) by weight residual monomers, 0.3 (max.) by weight ammonia, 0.05% by weight formaldehyde and 55% by weight water. The polymer is formed from the monomers ethyl acrylate, methyl methacrylate and carboxylic acid.

The adhesive is mixed with water and wetting agent in an amount at least sufficient to improve or enhance the adhesive effect of the composition on the insulation material. In most instances, the adhesive will be substantially dilute and preferably will be less than 5.0%, more preferably less than 2.5% and most preferably less than about 0.2% by weight adhesive. Where Robond TM is the adhesive used, the composition preferably will comprise about 1 pint (about 0.06% by weight) Wex TM and about 1 pint (about 0.11% by weight) Robond TM mixed in about 50 gallons of water.

The composition is applied to insulation material in an amount at least sufficient to cause the material to remain in the blown position in the cavity being filled until the cavity is covered or enclosed. Using the composition and material of the present invention, only a slight amount of moisture will be required to install the material and it will be only slightly damp to touch when installed.

It now will be appreciated that while installing the insulation material according to the present invention, the density of the installed insulation may be adjusted to a selected value by controlling the amount of liquid used to install the material. As shown in the examples below, the thermal resistance will vary with the density.

The density may be adjusted by adjusting the air flow on the blowing machine or by adjusting the fluid pressure on the spray assembly, or by a combination of these. Given a constant wet spray pressure, an increase in the material flow from the blower decreases the density of the installed material by decreasing the moisture content; or, a decrease in the material flow from the blower increases the density of the installed material by increasing the moisture content. Given a constant material flow for the blower, an increase in the fluid pressure in the spray apparatus will increase the density of the installed material by increasing the moisture content per unit of material; or, a decrease in fluid pressure in the spray will decrease the density of the installed material by decreasing the moisture content per unit of material.

When several stud spaces have been filled with insulation material, the surfaces are faced off, or screeded, with a straight-edge or an electric stud scrubber. The excess material which is only slightly damp, may all be recycled by mixing with dry material in the blowing machine and used to fill the next several spaces. Similarly, any overspray left after the completion of a job, which typically amounts to less than a sack, may be saved and used at a subsequent job.

Because the material is only slightly damp when installed, the wall (or surface of the cavity) may be covered almost immediately after installation is completed. However, if the installed material is observed for a few minutes before covering the wall, it will be noted that the material becomes even firmer to the touch. This is believed to be due to the further penetration of the composition into the fibers causing them to expand even further and to coil more tightly together. Thus, the fully set installation fits even more snugly in the cavity.

As previously indicated, in the preferred embodiment of this invention the insulation material being installed will be characterized as being impregnated with an expansion agent, usually a wetting agent. Preferably, the expansion agent will be a residual left in the fibers as a result of the above-described production method. It is believed that this residual substance coacts with the installation composition to provide an enhanced adhesive effect upon installation. For example, where a wetting agent and water have been used to expand the fibers during production, the residual of the wetting agent impregnated in the dry material will improve the penetration and adhesive effect of the wet spray composition comprising a wetting agent and an adhesive used to install the material.

EXAMPLES

Measurement of Required Chemical Load

Over a period of 4 hours, 680 sacks of insulation material were produced as described above. Starting materials used comprised about 30% blank newspaper, about 30% craft paper and about 40% cardboard. These were ground first in a hammer mill using a 1 to 1½ inch screen and then in a paddle mill using an 11/32 inch screen. Prior to the grinding in the paddle mill, boric acid powder (about 200 mesh) was added to the fibers at an average rate of about 14% of the total weight of the treated fibers.

After the final grind, the processed fibers were put through a ribbon flight blender. As the fibers entered the blender they were sprayed with a hot (about 180° F.) mixture comprising 1 pint Wex TM (described above) in 50 gallons of water. The solution was added at an average rate of about 3-4% of the weight of the dry material.

The final product was tested for flame spread by the use of the basket test method. Satisfactory flame resistance was achieved, there being an average weight loss shown of about 5% or less.

By way of comparison, about 500 sacks of material were produced as above except that the fibers were moistened with water only (no wetting agent) and the water was not heated. Gradually smaller amounts of chemical were added until the flame resistance was reduced unacceptably. Then, over a period of 4 hours, 665 sacks of insulation were run, and these runs demonstrated that an average of 21% of chemical (boric acid) was required to achieve the necessary flame resistance under these process conditions.

Based on the above data, it was concluded that the use of hot water containing a small amount of wetting agent to moisten the fibers after grinding markedly enhances the fire retardant effect of a given amount of boric acid. On an average, about 33% less chemical was required to produce insulation having the required flame resistance properties.

Thermal Resistance of Selected Densities

Insulation material produced and installed as described was commercially tested for thermal resistance according to Method C518 ASTM. The results are shown in Tables 1-6 below.

TABLE 1

Thermal Resistance ("R/in") of Installed Insulation Having a Density of 2 lb/ft$^3$ and a Representative Thickness of 2.047 Inches

| Sample No. | R/in | Mean Temperature |
|---|---|---|
| 1 | 3.67 | 79.1 |
| 2 | 3.65 | 78.8 |
| 3 | 3.62 | 78.5 |
| 4 | 3.70 | 77.9 |

TABLE 2

Thermal Resistance ("R/in") of Installed Insulation Having a Density of 2.5 lb/ft$^3$ and a Representative Thickness of 2.047 Inches

| Sample No. | R/in | Mean Temperature |
|---|---|---|
| 1 | 3.91 | 73.4 |
| 2 | 3.93 | 73.4 |
| 3 | 3.90 | 73.6 |
| 4 | 3.92 | 73.8 |

TABLE 3

Thermal Resistance ("R/in") of Installed Insulation Having a Density of 3.0 lb/ft$^3$ and a Representative Thickness of 2.047 Inches

| Sample No. | R/in | Mean Temperature |
|---|---|---|
| 1 | 4.16 | 74.7 |
| 2 | 4.15 | 74.6 |
| 3 | 4.14 | 74.5 |
| 4 | 4.13 | 74.6 |

TABLE 4

Thermal Resistance ("R/in") of Installed Insulation Having a Density of 3.5 lb/ft$^3$ and a Representative Thickness of 2.047 Inches

| Sample No. | R/in | Mean Temperature |
|---|---|---|
| 1 | 4.25 | 74.1 |
| 2 | 4.23 | 74.1 |
| 3 | 4.31 | 74.0 |
| 4 | 4.27 | 74.0 |

TABLE 5

Thermal Resistance ("R/in") of Installed Insulation Having a Density of 4.0 lb/ft$^3$ and a Representative Thickness of 2.047 Inches

| Sample No. | R/in | Mean Temperature |
|---|---|---|
| 1 | 4.43 | 72.8 |
| 2 | 4.37 | 73.3 |
| 3 | 4.40 | 73.0 |
| 4 | 4.40 | 73.0 |

TABLE 6

Thermal Resistance ("R/in") of Installed Insulation Having a Density of 4.5 lb/ft$^3$ and a Representative Thickness of 2.047 Inches

| Sample No. | R/in | Mean Temperature |
|---|---|---|
| 1 | 4.42 | 73.9 |
| 2 | 4.46 | 73.9 |
| 3 | 4.44 | 73.7 |
| 4 | 4.51 | 73.7 |

"Representative Thickness" means a thickness at which the R-value per unit will vary no more than plus or minus 2% with increases in thickness.

As previously observed, the installation method of the present invention allows the material to be installed using very little moisture and, thus, at a range of densities. Yet, these tests shown that even at the lower densities, satisfactory R-values (thermal resistance) were achieved. Based on the above data, the optimum densities are about 2.5 to 4.0 lb/ft$^3$.

From the foregoing, it will be appreciated that the present invention offers many advantages in the production of wet spray cellulosic insulation material and in the wet spray open cavity installation of such cellulosic insulation material. Lesser amounts of expensive chemicals are required to produce insulation having the required flame resistant properties. Also, insulation material may be installed less densely so that less material is required and waste is practically eliminated.

Changes may be made in the nature, composition, operation and arrangement of the various elements, steps and procedures described herein without departing from the spirit and scope of the invention as defined in the following claims.

What is claimed is:

1. A method for producing spray cellulosic insulation material, comprising:
   moistening processed cellulosic fibers with an expansion agent whereby the fibers become at least partially re-expanded.

2. The method of claim 1 in which the expansion agent comprises water having a nonionic wetting agent mixed therein.

3. The method of claim 2 in which the wetting agent comprises an alcohol.

4. The method of claim 3 in which the wetting agent comprises a polyoxyethylenated straight-chain alcohol and is present in the mixture in an amount less than about 0.1% by weight.

5. The method of claim 4 in which the moistening is carried out by spraying tumbling cellulosic fibers with the mixture and in which the mixture is heated.

6. The method of claim 1 in which the moistening is carried out by spraying tumbling cellulosic fibers with the expansion agent and in which the expansion agent comprises hot water having a wetting agent mixed therein.

7. A method for open cavity installation of cellulosic insulation material comprising:

blowing the insulation material into place while moistening the material with a composition capable of rendering the blown material sufficiently adhesive.

8. The method of claim 7 in which the composition comprises water and a nonionic wetting agent mixed therein.

9. The method of claim 8 in which the wetting agent comprises an alcohol.

10. The method of claim 9 in which the wetting agent comprises a polyoxyethylenated straight-chain alcohol which is present in the water in an amount less than about 0.1% by weight.

11. The method of claim 8 in which the composition further comprises an adhesive mixed in the water with the wetting agent.

12. The method of claim 10 in which the composition further comprises an adhesive comprising an aqueous acrylic emulsion present in the mixture in an amount less than about 2.0% by weight.

13. The method of claim 7 in which the insulation material is produced by a method comprising:
moistening processed cellulosic fibers with an expansion agent whereby the fibers become at least partially expanded.

14. The method of claim 13 in which the composition comprises water having a nonionic wetting agent mixed therein.

15. The method of claim 14 in which the composition further comprises an adhesive mixed with the wetting agent in the water.

16. The method of claim 7 in which the insulation material to be installed is characterized by being impregnated with an expansion agent capable of coacting with the composition to provide enhanced adhesive effects.

17. The method of claim 16 in which the composition comprises a wetting agent and an adhesive mixed in water.

18. The method of claim 17 in which the wetting agent in the mixture and in the material is nonionic and the adhesive in the composition comprises an acrylic polymer emulsion.

19. Spray cellulosic insulation material characterized by being impregnated with an expansion agent.

20. The cellulosic insulation material of claim 19 in which the expansion agent is a nonionic wetting agent.

21. The cellulosic insulation material of claim 20 in which the wetting agent comprises an alcohol.

22. The cellulosic insulation material of claim 21 in which the wetting agent comprises a polyoxyethylenated straight-chain alcohol.

23. Cellulosic insulation material produced by a method comprising:
moistening processed cellulosic fibers with an expansion agent whereby the fibers become at least partially expanded.

24. The cellulosic insulation material of claim 23 in which the expansion agent is water having a nonionic wetting agent mixed therein.

25. The cellulosic insulation material of claim 24 in which the wetting agent is an alcohol.

26. The cellulosic insulation material of claim 25 in which the wetting agent is a polyoxyethylenated straight-chain alcohol.

27. The cellulosic insulation material of claim 26 in which the moistening is carried out by spraying tumbling cellulosic fibers with the mixture and in which the mixture is heated.

28. Cellulosic insulation material installed in a cavity by a method comprising:
blowing the insulation material into place while moistening the material with a composition capable of rendering the blown material sufficiently adhesive.

29. The installed cellulosic insulation material of claim 28 in which the composition comprises water having a nonionic wetting agent mixed therein.

30. The installed cellulosic insulation material of claim 29 in which the wetting agent comprises an alcohol.

31. The installed cellulosic insulation material of claim 30 in which the wetting agent comprises a polyoxyethylenated straight-chain alcohol.

32. The installed cellulosic insulation material of claim 29 in which the composition further comprises an adhesive mixed in the water with the wetting agent.

33. The installed cellulosic insulation material of claim 31 in which the composition further comprises an adhesive comprising an acrylic polymer emulsion mixed in the water with the wetting agent.

34. The installed cellulosic insulation material of claim 28 in which the insulation material is characterized as being impregnated with a nonionic wetting agent prior to being installed.

35. A composition for moistening spray cellulosic insulation material during open cavity installation comprising an expansion agent and an adhesive mixed in a liquid and characterized by being capable of penetrating and at least partially expanding the cellulose fibers and rendering the material sufficiently adhesive for installation.

36. The composition of claim 35 in which the expansion agent comprises a nonionic wetting agent and in which the liquid is water.

37. The composition of claim 36 in which the wetting agent comprises an alcohol and the adhesive comprises an acrylic polymer.

38. The composition of claim 37 in which the wetting agent comprises a polyoxyethylenated straight-chain alcohol.

39. The composition of claim 35 in which the adhesive comprises an acrylic polymer emulsion.

40. The composition of claim 38 in which the adhesive comprises an acrylic polymer emulsion.

41. The composition of claim 40 in which the wetting agent is present in an amount less than about 0.1% by weight and the adhesive is present in an amount less than about 0.2% by weight.

* * * * *